G. KAPP.
OSCILLATING PHASE ADVANCER.
APPLICATION FILED NOV. 22, 1915.

1,236,716.

Patented Aug. 14, 1917.
2 SHEETS—SHEET 1.

WITNESSES:

INVENTOR
Gisbert Kapp.
BY
ATTORNEY

G. KAPP.
OSCILLATING PHASE ADVANCER.
APPLICATION FILED NOV. 22, 1915.

1,236,716.

Patented Aug. 14, 1917.
2 SHEETS—SHEET 2.

WITNESSES:

INVENTOR
Gisbert Kapp.
BY
ATTORNEY

UNITED STATES PATENT OFFICE.

GISBERT KAPP, OF BIRMINGHAM, ENGLAND, ASSIGNOR TO THE WESTINGHOUSE ELECTRIC & MANUFACTURING COMPANY, A CORPORATION OF PENNSYLVANIA.

OSCILLATING PHASE-ADVANCER.

1,236,716.      Specification of Letters Patent.      Patented Aug. 14, 1917.

Original application filed March 4, 1912, Serial No. 681,458. Divided and this application filed November 22, 1915. Serial No. 62,763.

*To all whom it may concern:*

Be it known that I, GISBERT KAPP, a subject of the King of Great Britain, and a resident of Birmingham, England, have invented a new and useful Improvement in Oscillating Phase-Advancers, of which the following is a specification.

My invention relates to apparatus for power-factor control, and it has for its object to provide a dynamo-electric machine that shall perform the function specified in an efficient and effective manner, this application being a division of my application, Serial No. 681,458, filed Mar. 4, 1912.

Figure 1:
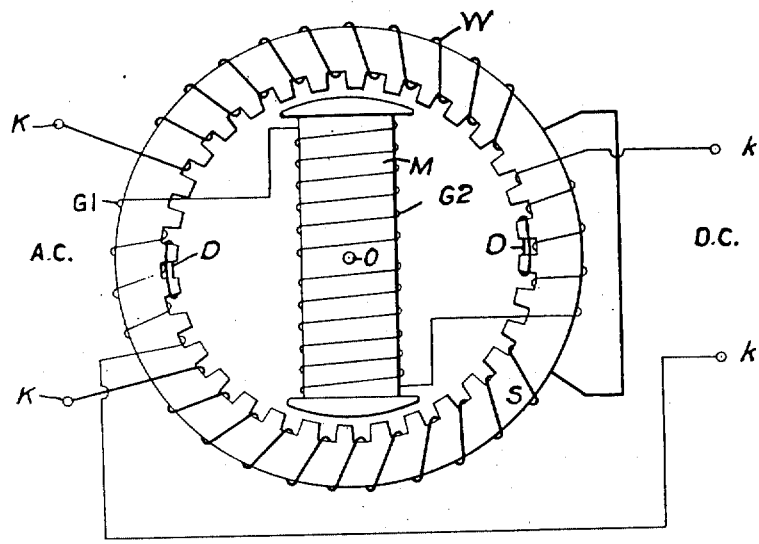
Figure 2:
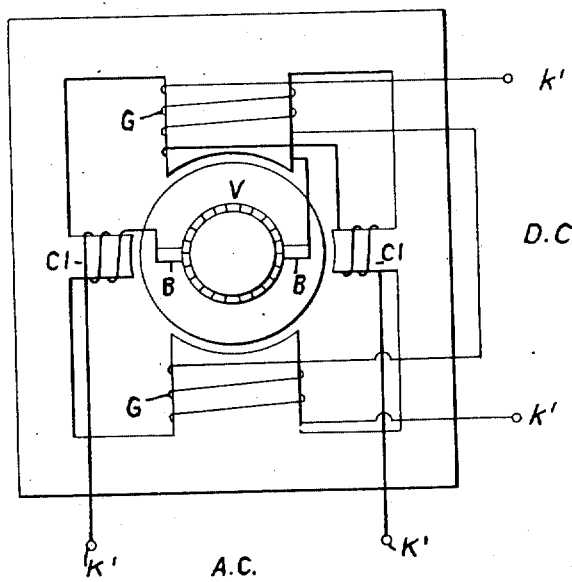
Figure 3:
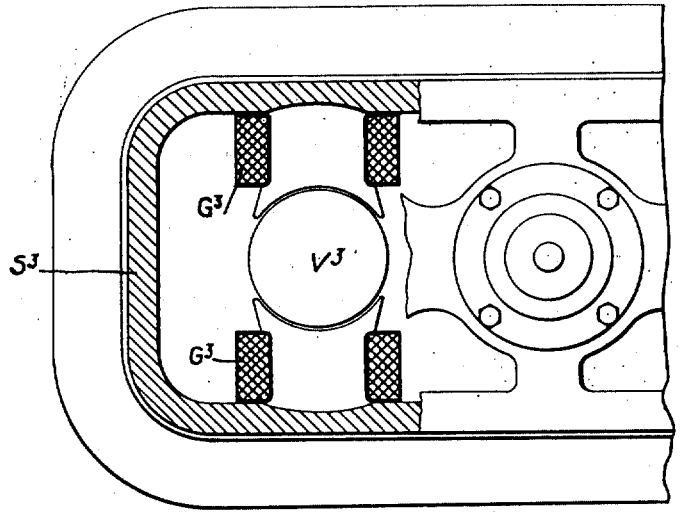
Figure 4:
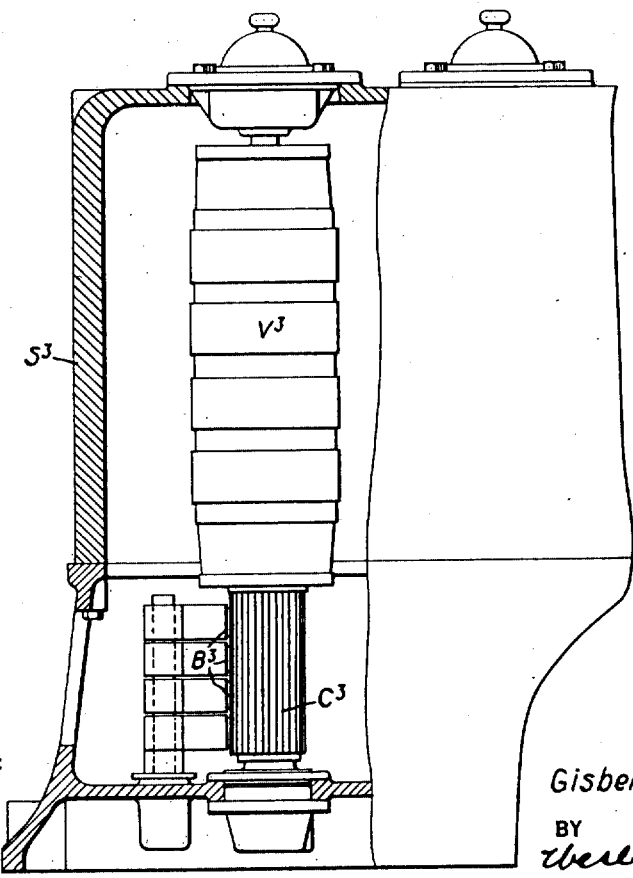

In the accompanying drawing, Figure 1 is a diagrammatic view of a dynamo-electric machine embodying one form of my invention; Fig. 2 is a diagrammatic view of a modification of the machine shown in Fig. 1; and Figs. 3 and 4 are top and side views, respectively, partially in section and partially in elevation, illustrating an actual embodiment of the machine shown in Fig. 2 and adapted for power-factor control in a plurality of phases or in a plurality of independent circuits.

It is well known that the presence of inductive apparatus in alternating-current systems causes the current wave produced by a voltage wave to lag behind said voltage wave, thus lowering the power-factor and producing inefficient transmission, poor regulation and other serious consequences.

By my invention, I employ a dynamo-electric machine wherein either the stator or the rotor winding is inserted in the alternating-current circuit in which it is desired to adjust the power-factor, and the remaining winding is excited from a source of direct current. The rotor of said machine is therefore oscillated in synchronism with the frequency of the alternating current absorbing energy from the latter portion of each current wave, storing said energy in the form of momentum, and recuperating said energy just before and upon the first portion of the succeeding current wave, all in the general manner described in an article by M. Le Blanc appearing on page 171 *et seq.* of "*L'Eclairage Electrique*" for Aug. 5, 1899. The phase of the resultant current wave may be made to approximate that of the attendant voltage wave as closely as desired by proper design of the dynamo-electric machine and by suitable adjustment of the direct-current excitation thereof.

Referring to Fig. 1 of the drawing for a more detailed understanding of my invention, the stator winding is, for the sake of simplicity, shown as a ring winding, but it will be readily understood that a drum winding may be employed. S is the iron core of the stator, carrying an alternating-current winding W, whose terminals are K K. M is a bar magnet pivoted at O and provided with a direct-current winding $G_2$, which latter may be put in series with the direct-current winding $G_1$ on the stator. The pole pieces of the magnet M are so shaped as to sweep as closely as is mechanically possible in front of the stator winding. By this construction, with a given field excitation, a magnetic field of maximum strength may be obtained. The terminals of the direct-current winding are marked *k. k.* D. D. are damping windings. The object of the series winding G' is to secure to the magnet a zero position and to prevent it from vibrating through a greater angle than 90 degrees from the zero position. The latter is also the object of the damping winding. So long as no alternating current is sent through the stator, the vibrator will remain at rest in such position that its magnetic axis coincides with the magnetic axis produced in the stator by its direct-current winding: this is what I have herein termed the zero position. If an alternating current of the low frequency of the slip is passed through the stator, the bar magnet M is acted upon by mechanical forces that alternate in direction with the alternations of the current and is thus set into vibration of the same frequency. Owing to the interaction between these electro-dynamic forces and the mass inertia of the vibrator, the zero position is passed at the instants when the current passes through zero, while the reversal of motion takes place at the instants when the current has crest values. Since, on passing zero position, the vibrator has maximum speed, the E. M. F. induced in the stator winding is at these instants also at maximum. It follows that the injected E. M. F. has crest value at the instant when current passes through zero; and it has zero value at the instant of reversal of movement when the current has crest value. Thus, the condition of quadrature between the current causing the vibration and the E. M. F. produced by this vibration is brought about. That the E. M. F. must be a leading E. M. F. will be obvious from the following consideration: After passing zero position in either sense, the current opposes the motion and thus brings the magnet to rest at the end of its swing. The energy stored kinetically in the vibrator is, during this period, transferred electro-dynamically to the alternating-current circuit. The circuit receives energy during the time that the current grows. On reversal, when the vibrator approaches its zero position, it must be accelerated by the dynamic force of the current. The vibrator takes energy from the circuit during the time that the current decreases from its crest value to zero. Thus, the circuit receives energy while the current is growing and must yield up energy while the current is waning, with the result that both the growth and decline of the current are accelerated, which means that the phase of the current is advanced in relation to the E. M. F. of the slip which originally caused it to flow.

Referring now to Fig. 2, the effect of the improved arrangement is likewise due to the relative motion between an alternating-current and a direct-current magnet, and, therefore, the explanation of this effect, as above given in connection with Fig. 1, is also applicable. When the alternating-current magnet is made the oscillating member of the system, it is of cylindrical shape and provided with a drum winding and commutator similar to that used in a direct-current dynamo.

In the arrangement shown in Fig. 1, the angular deflection of the swinging system is limited to less than 90 degrees at each side of the mid position. By the arrangement shown in Fig. 2, this limitation is removed, and the magnitude of the injected E. M. F. is increased.

The essential parts of this arrangement of the vibrator are shown in Fig. 2. The stator is constructed in the manner of the field-magnet system of a direct-current dynamo and is energized by the coils G. G. to which current from any convenient source is supplied through the terminals $k'$ $k'$. The vibrator V is constructed after the manner of an ordinary direct current armature, and the alternating current is supplied to it by brushes B, B bearing on its commutator. The vibrator V is of such size as to sweep as close as is mechanically possible in front of the pole pieces of the stator, as in the device of Fig. 1. Owing to the use of a commutator, the angle of vibration is not limited to something under 90 degrees, as in the first described arrangement, but may be any angle corresponding to the interaction between mass inertia and the dynamic forces of the alternating current. Commutating poles $C_1$, $C_1$ may be provided, although the necessity of using them is less than in the case of a direct-current dynamo, since, when the speed of commutation is at maximum the current is at zero and when the current is at maximum the speed of commutation is at zero.

Referring to Figs. 3 and 4, a field frame $S^3$ is provided and arranged to support any desired number of oscillating armatures $V^3$, each of which is embraced by a pair of main poles excited by suitable direct-current windings $G^3$, $G^3$. Each of the vibrating or oscillating armatures $V^3$ is provided with a commutator $C^3$ upon which bear brushes $B^3$ for connection to the alternating-current circuit in which the power factor is to be adjusted.

The fact that the commutated current is a maximum at standstill and a minimum at full speed so simplifies the problem of sparking at the brushes that the short-circuit reactance of the coils undergoing commutation may be disregarded. An air gap of minimum length may be employed, therefore, thus permitting a very strong magnetic field and a resultant powerful operating torque, with the expenditure of but little energy for excitation. Furthermore, the presence of a strong field and small air gap minimizes the effect of unbalanced field and permits the use of a relatively slender shaft, with still greater consequent possibilities in the reduction of the reluctance of the magnetic path and the resultant production of a strong flux with but little exciting current.

I claim as my invention:

1. The combination with a dynamo-electric machine comprising an armature provided with a winding and a commutator connected thereto, brushes bearing upon said commutator, and a field magnet associated with said armature and provided with main and auxiliary field windings, of a source of alternating current, connections from said source through said auxiliary field winding to said brushes, a source of direct current, and connections from said direct-current source to said main field winding.

2. The combination with a dynamo-electric machine comprising an armature provided with a winding and a commutator connected thereto, brushes bearing upon said commutator, and a field magnet associated with said armature and provided with a main field winding, of a source of alternating current, connections from said source to said brushes, a source of direct current, connections from said direct-current source to said main field winding, whereby said armature is caused to oscillate, and means for causing the effective oscillating force in one direction to exceed that in the other direction.

3. The combination with a dynamo-electric machine comprising an armature provided with a winding and a commutator connected thereto, brushes bearing upon said commutator, and a field magnet associated with said armature and provided with a main field winding, of a source of alternating current, connections from said source to said brushes, a source of direct current, connections from said direct-current source to said main field winding, whereby said armature is caused to oscillate, and means for superposing on the unidirectional magnetic flux generated by said main field winding an alternating magnetic flux of the frequency of said alternating-current source, whereby the effective oscillatory torque in one direction is caused to exceed that in the other direction.

4. The combination with a dynamo-electric machine provided with a wound armature and with a field magnet and having the minimum air gap therebetween that is mechanically possible, of a source of alternating current, connections from said source to the winding of said armature, a source of direct current, connections from said direct-current source to the winding of said field magnet, and means for causing the interaction of the field and armature magnetic fluxes to oscillate said armature through a greater arc than the polar pitch.

5. The combination with a dynamo-electric machine provided with a wound armature and with a field magnet and having the minimum air gap therebetween that is mechanically possible, of a source of alternating current, connections from said source to the winding of said armature, a source of direct current, connections from said direct-current source to the winding of said field magnet, said armature being mounted to be freely movable except for the forces exerted by the interaction of the field and armature magnetic fluxes, and means for causing said forces to oscillate said armature through an angle greater than the polar pitch.

6. In a dynamo-electric machine provided with as short an air gap as is mechanically possible, the combination with a field magnet, of an armature mounted adjacent thereto, each of said members being provided with a winding, sources of direct and of alternating current, connections for energizing one of said windings from said direct-current source and the other of said windings from said alternating-current source, mounting means for said armature permitting it to oscillate freely except for the forces exerted thereupon by the interaction of the field and armature magnetic fluxes, and means for causing said forces to oscillate said armature through an angle greater than the polar pitch.

7. In a dynamo-electric machine provided with as short an air gap as is mechanically possible, the combination with two adjacent relatively movable magnetizable members, each of which is provided with an exciting winding, of sources of direct and of alternating current, connections from one of said windings to said alternating-current source and from the other of said windings to said direct-current source, whereby one of said members is magnetized by an alternating flux and the other by a unidirectional flux and said members are caused to move relatively to each other and an electromotive force is generated in said alternating-current winding by cutting said unidirectional magnetic flux, and means whereby a conductor of said alternating-current winding is caused to cut said unidirectional field a plurality of times during each half cycle of alternating current.

8. An appliance adapted to be used for injecting a leading electromotive force into an alternating-current circuit, said appliance comprising, in combination, a field-magnet system of fixed polarity, a two pole, drum-wound armature mounted with as small a clearance as is mechanically possible in said field-magnet system, a commutator, brushes adapted to be connected to said circuit to lead current therefrom to said armature to actuate the same, and means for supporting said armature in such manner as to leave it free to rotate alternately clockwise and counter-clockwise, said armature being free from connection with any other part or with any external force or controlling influence other than its electrical contact with the aforesaid brushes so that the vibratory movement of said armature will be produced solely by the passage therethrough of the alternating current itself.

In testimony whereof, I have hereunto subscribed my name this 20 day of October, 1915.

GISBERT KAPP.